(12) United States Patent
Chen et al.

(10) Patent No.: US 7,400,368 B2
(45) Date of Patent: Jul. 15, 2008

(54) LIQUID CRYSTAL DISPLAYS WITH LIQUID CRYSTAL MOLECULES AND POLYMERS IN WHICH THE POLYMERS ADHERE TO THE SUBSTRATES AND CAPSULATE THE MOLECULES

(75) Inventors: Yi-Ju Chen, Taichung (TW); Chia-Yu Lee, Banciao (TW); Chieh-Ting Chen, Taipei (TW); Po-Lun Chen, Chiayi (TW)

(73) Assignee: Au Optronics Corp., Hsinchu (TW)

( * ) Notice: Subject to any disclaimer, the term of this patent is extended or adjusted under 35 U.S.C. 154(b) by 387 days.

(21) Appl. No.: 11/243,086

(22) Filed: Oct. 4, 2005

(65) Prior Publication Data

US 2006/0203147 A1    Sep. 14, 2006

(30) Foreign Application Priority Data

Mar. 14, 2005    (TW)    .............................. 94107673 A

(51) Int. Cl.
*G02F 1/1333*    (2006.01)
(52) U.S. Cl. .............................. 349/86; 349/88; 349/91; 349/92
(58) Field of Classification Search .............. 349/86–92
See application file for complete search history.

(56) References Cited

U.S. PATENT DOCUMENTS

| 6,014,194 | A | 1/2000 | Kuo et al. ....................... 349/88 |
| 6,122,024 | A * | 9/2000 | Molsen et al. ................. 349/88 |
| 6,259,498 | B1 * | 7/2001 | Takeda ......................... 349/84 |
| 6,781,665 | B2 | 8/2004 | Nakanishi et al. ........... 349/183 |

FOREIGN PATENT DOCUMENTS

JP    09/005749    1/1997
WO    WO2004083947    9/2004

OTHER PUBLICATIONS

Taiwan Office Action dated Feb. 7, 2006.
China Office Action mailed Dec. 8, 2006.

* cited by examiner

*Primary Examiner*—David C. Nelms
*Assistant Examiner*—John Heyman
(74) *Attorney, Agent, or Firm*—Thomas, Kayden, Horstemeyer & Risley

(57) ABSTRACT

Liquid crystal displays and fabrication methods thereof. The liquid crystal display comprises a first substrate with an active matrix of a plurality of pixels. A second substrate is provided opposing the first substrate. A liquid crystal layer is interposed between the first substrate and the second substrate. Each pixel comprises a polymer dispersed liquid crystal layer corresponding to a first liquid crystal region and a non-polymer dispersed liquid crystal layer corresponding to a second liquid crystal region.

20 Claims, 11 Drawing Sheets

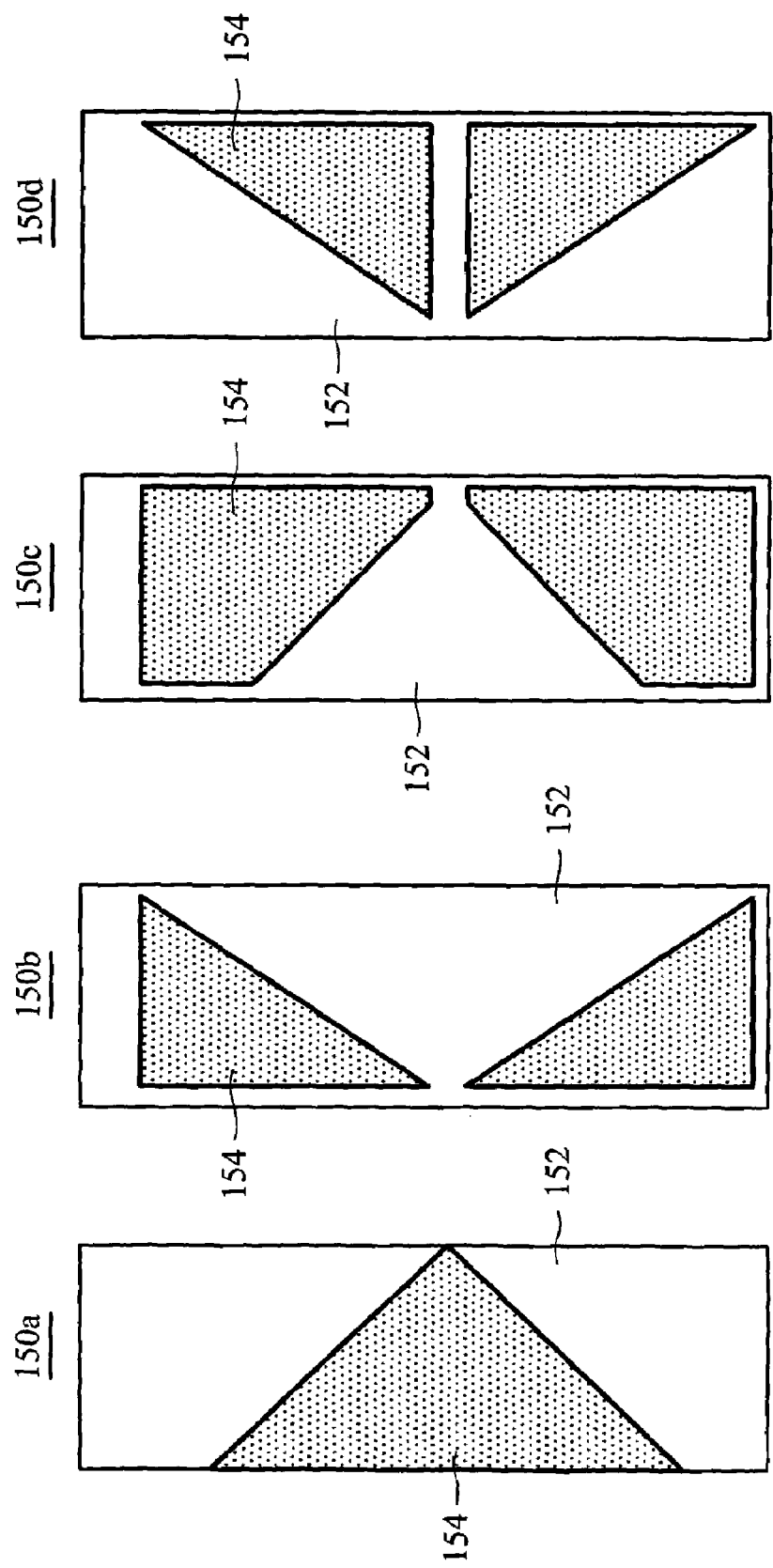

LIQUID CRYSTAL DISPLAYS WITH LIQUID CRYSTAL MOLECULES AND POLYMERS IN WHICH THE POLYMERS ADHERE TO THE SUBSTRATES AND CAPSULATE THE MOLECULES

BACKGROUND

The invention relates to liquid crystal displays and fabrication methods thereof, and more particularly, to polymer dispersed liquid crystal (PDLC) displays and fabrication methods thereof.

Among flat panel displays, liquid crystal displays (LCDs) exhibit characteristics of light weight, low power consumption, and good outdoor reliability, and are therefore widely applied in portable computers, notebooks, mobile phones, and personal digital assistances (PDAs). Conventional twisted nematic mode LCDs are disadvantageous due to their small viewing angle. Some proposed LCDs, such as, in-plane switching mode LCD (IPS-LCD) or multi-domain vertical alignment LCD (MVA-LCD) attempt to improve the viewing characteristics of conventional LCDs.

Conventional MVA-LCDs, however, possess less transparency than TN mode LCDs. Moreover, conventional MVA-LCDs image sticking may occur in display over a long period of time. U.S. Pat. No. 6,781,665, the entirety of which is hereby incorporated by reference, discloses a method for fabricating a polymer dispersed liquid crystal (PDLC) display. The polymer dispersed liquid crystal (PDLC) display is formed by mixing liquid crystal and monomer and radiating UV thereon with a bias. Polymers dispersed in liquid crystal can help liquid crystal recovery, thereby reducing imaging sticking.

FIG. 1 is a schematic view of a conventional method for fabricating a polymer dispersed liquid crystal display. A liquid crystal display panel is disposed in an ultra-violet light irradiation chamber 32. A power supply 30 applies a bias between an upper electrode 34 and a lower electrode 36. A liquid crystal layer 38 between the upper electrode 34 and the lower electrode 36 comprises a mixture of liquid crystal and monomer. When the liquid display panel is irradiated by UV light, the monomer is polymerized to form a continuous network. Moreover, during polymerization, the orientation of the liquid crystal becomes more consistent with the polymer.

FIG. 2 is a cross section of a conventional polymer dispersed liquid crystal display. After an irradiating or a heating process, monomers in the liquid crystal layer 38 between upper substrate 10 and lower substrate 20 are polymerized into polymer structures 13. Polymer structures 13 are formed adjacent to alignment layers 46a and 46b. Polymer structures 13 can aid in liquid crystal recovery, thereby reducing image sticking.

U.S. Pat. No. 6,014,194, the entirety of which is hereby incorporated by reference, discloses a polymer dispersed liquid crystal (PDLC) display. Monomers are added into liquid crystal. The mixture of monomers and liquid crystals in each of red, green, and blue color pixels are separately polymerized with UV irradiation under different biases, thereby creating a different polymer structure in each pixel.

SUMMARY

Accordingly, the invention provides a wide viewing angle liquid crystal display. Each pixel of the wide viewing angle liquid crystal display is divided into muti-region with different polymer density and structure. Each region has different optical characteristics to improve the viewing angle.

The invention also provides a liquid crystal display, comprising a first substrate with an active matrix of a plurality of pixels. A second substrate is provided opposing the first substrate. A liquid crystal layer is interposed between the first substrate and the second substrate. Each pixel comprises a polymer dispersed liquid crystal layer corresponding to a first liquid crystal region and a non-polymer or low-density polymer dispersed liquid crystal layer corresponding to a second liquid crystal region.

The invention further provides a method for fabricating a liquid crystal display. A first substrate is provided with an active matrix of a plurality of pixels. A second substrate is provided opposing the first substrate. A liquid crystal layer is interposed between the first substrate and the second substrate. Each pixel comprises a polymer dispersed liquid crystal layer corresponding to a first liquid crystal region and a non-polymer or low-density polymer dispersed liquid crystal layer corresponding to a second liquid crystal region.

The invention further provides a method for fabricating a liquid crystal display. A first substrate is provided with an active matrix of a plurality of pixels. A second substrate is provided opposing the first substrate. A liquid crystal layer with monomers is interposed between the first substrate and the second substrate. The monomers are selectively polymerized in the liquid crystal layer such that each pixel comprises a polymer dispersed liquid crystal layer corresponding to a first liquid crystal region and a non-polymer or low-density polymer dispersed liquid crystal layer corresponding to a second liquid crystal region.

DESCRIPTION OF THE DRAWINGS

The invention can be more fully understood by reading the subsequent detailed description in conjunction with the examples and references made to the accompanying drawings, wherein:

FIGS. 5A-5D are schematic views showing various embodiments of the lithographic masks.

DETAILED DESCRIPTION

Figure 1:
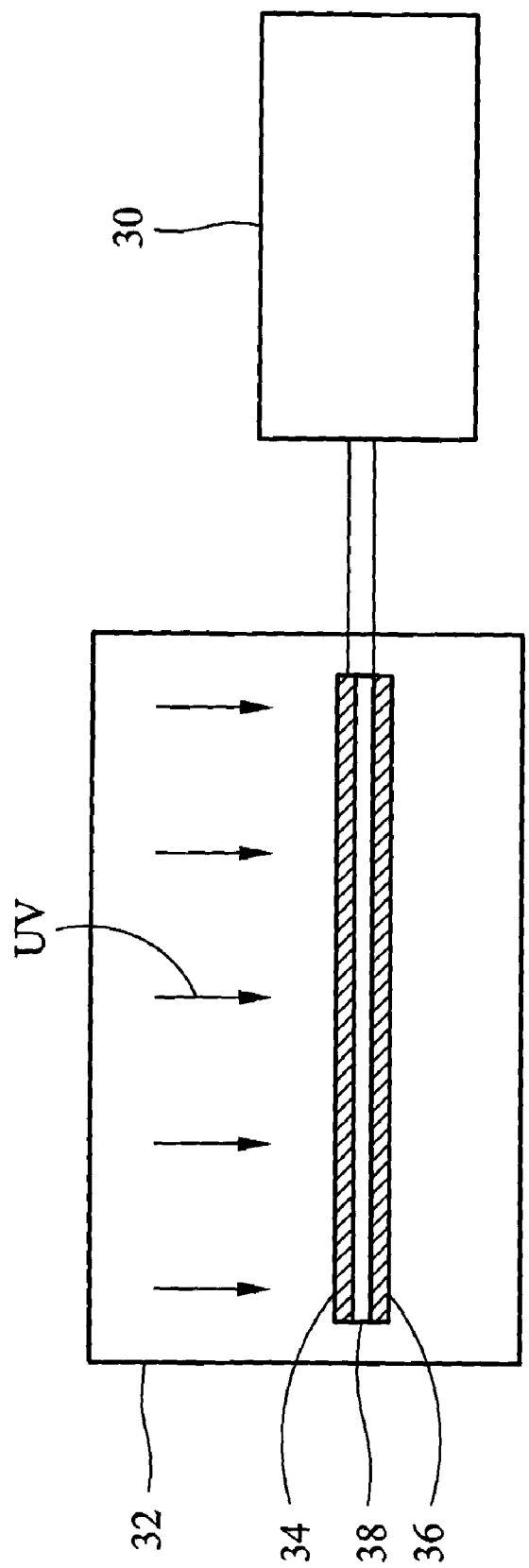
FIG. 1 is a schematic view of a conventional method for fabricating a polymer dispersed liquid crystal display.
Figure 2:
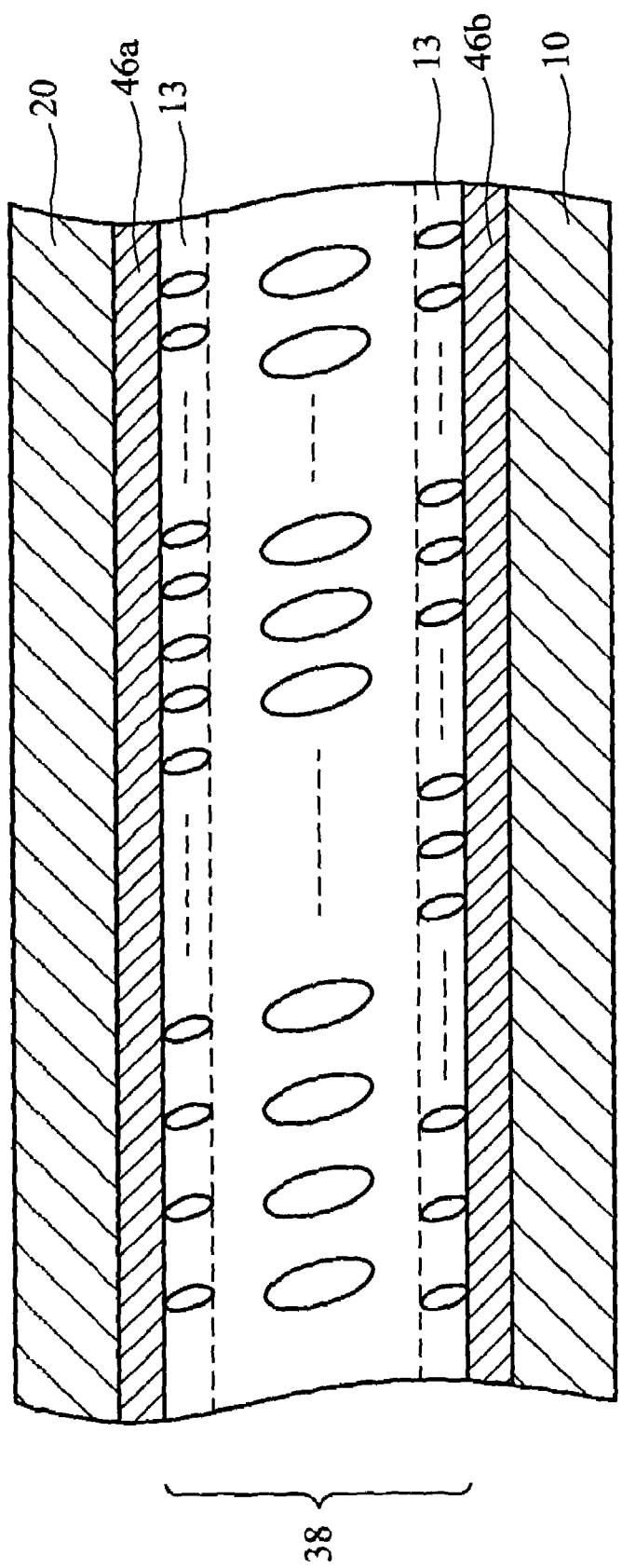
FIG. 2 is a cross section of a conventional polymer dispersed liquid crystal display.

FIGS. 3A-3D are cross sections of an embodiment of a method of fabricating a polymer dispersed liquid crystal display, in which a liquid crystal display comprises a first substrate 110 with an active matrix array pixel driven, and a second substrate 120 opposing the first substrate 110. A liquid crystal layer 130 is interposed between the first substrate 110 and the second substrate 120. A first electrode 112 and a second electrode 122 are separately disposed on the inner surface of the first substrate 110 and the second substrate 120. The liquid crystal layer 130 comprises liquid crystal molecules 132, monomers 134 and inducers (not shown) to improve polymerization. Monomers 130 may preferably comprise diacrylate, monoacrylate, or other monomers with a double bond. After irradiation, the monomers are decomposed into free radicals and react with each other. An initiator can be optionally added to improve polymerization.

Figure 3A:
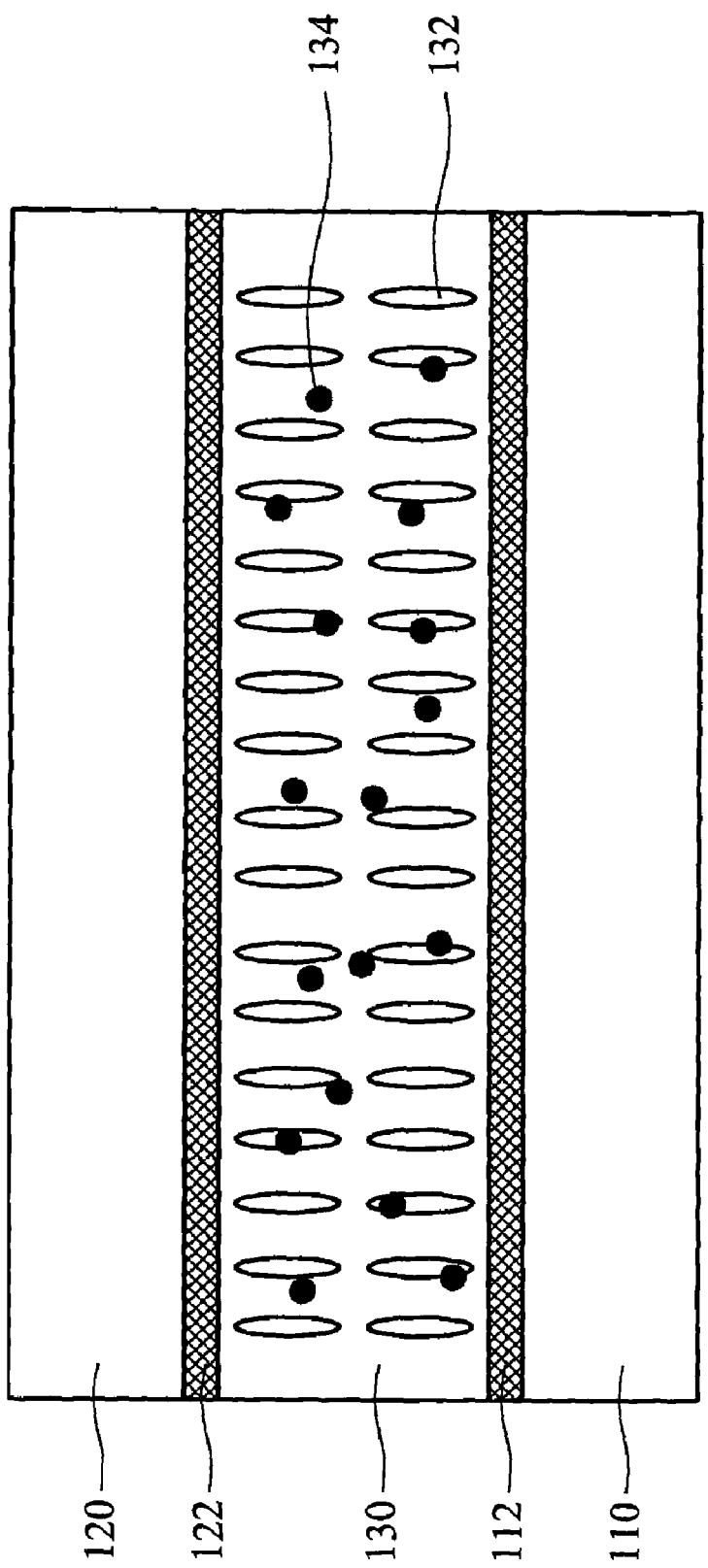
FIGS. 3A-3D are cross sections of an embodiment of a method of fabricating a polymer dispersed liquid crystal display.
Figure 3B:
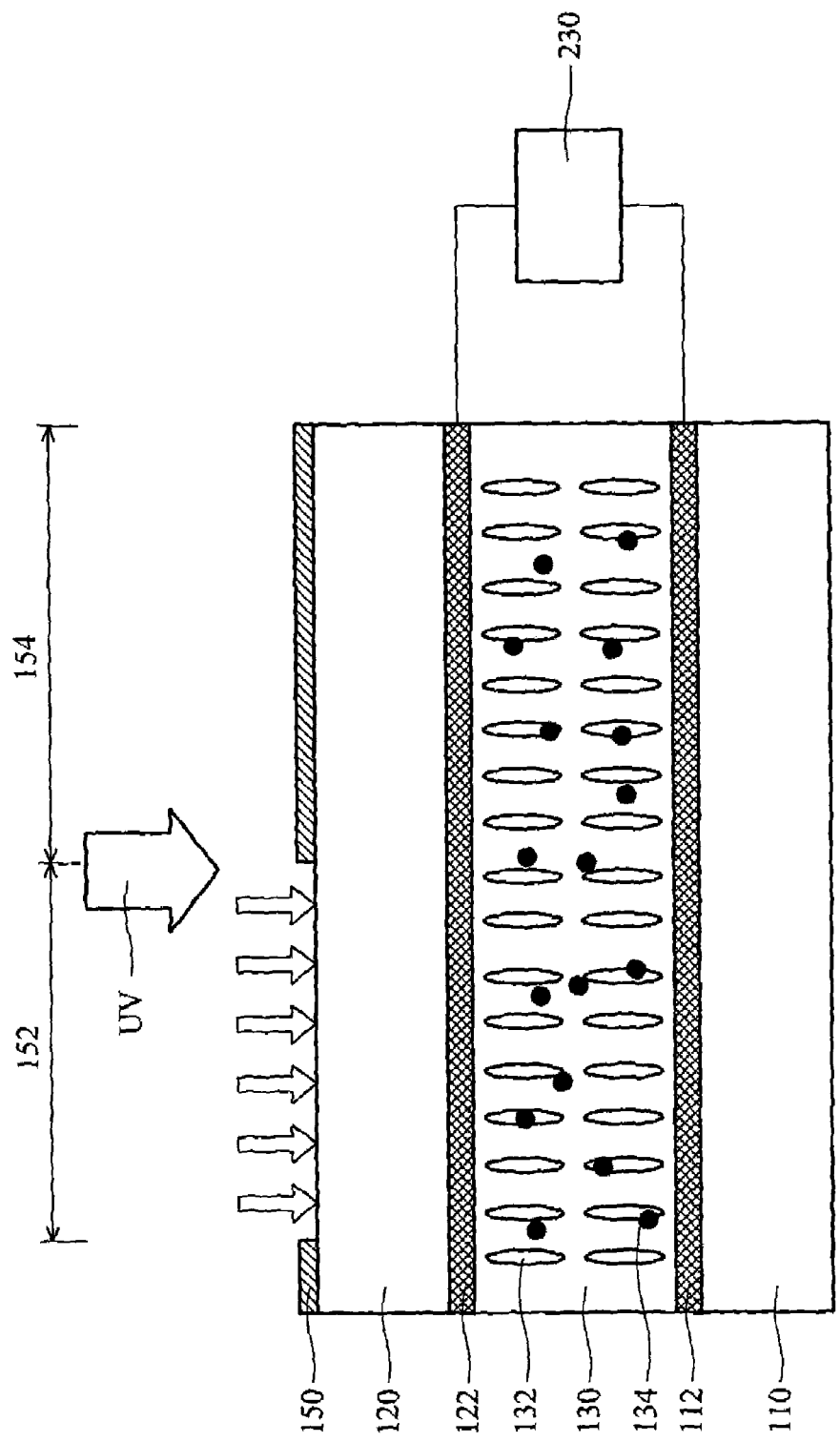

Referring to FIG. 3B, a liquid crystal display with monomer dispersed therein is disposed in an apparatus installed by UV irradiation. A power supply 230 biases a first and a second electrode of the liquid crystal display. Each pixel of the liquid crystal can be divided into at least one LC region 152. UV light can irradiate predetermined region and be optionally biased between the first and the second electrodes 112 and 122. A polymer dispersed liquid crystal display is therefore formed to aid in liquid crystal recovery and reduce imaging sticking and improve the color performance in wide viewing angle.

Selective UV irradiation is performed by lithography forming a patterned mask 150 on the first substrate 110 or the second substrate 120. An opening is formed at the predetermined first LC region 152 on the second substrate 120. The liquid crystal configuration is then irradiated by UV polymerizing monomers 134 at the first LC region 152.

Figure 3C:
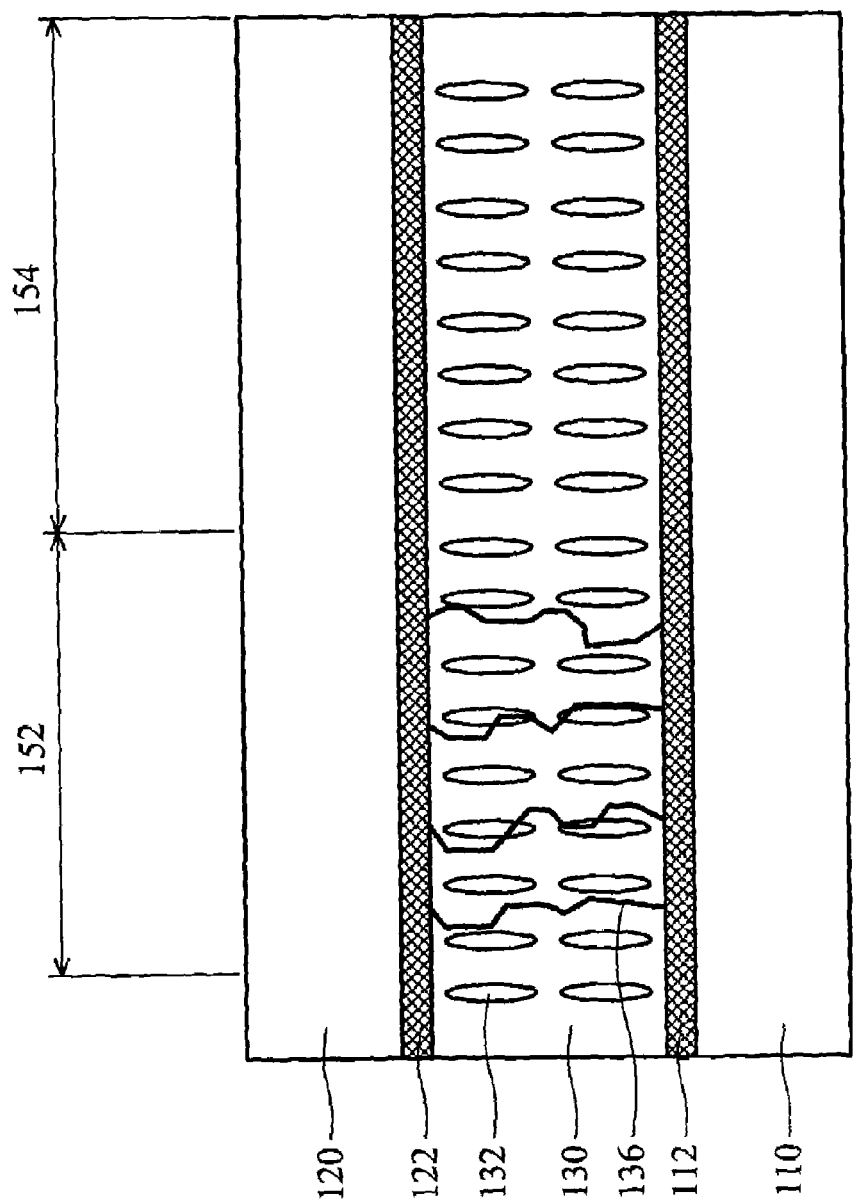

Referring to FIG. 3C, a network 136 of monomer 134 is formed, when the liquid crystal layer 130 is irradiated by UV light. After the monomers 134 are polymerized, the orientation of the liquid crystal molecules 132 becomes more consistent.

In another embodiment, the light source can optionally be focused and directly irradiated at predetermined region 152. An optional bias can be applied between the first and the second electrodes to polymerize the monomer 132, thereby eliminating lithographic masking steps. For example, a laser beam is directly focused on the predetermined region. The unselected region does not irradiate. Alternatively, the unselected region is determined between two laser beams. Interference between the two laser beams creates energy distribution, thereby creating polymer density distribution in the liquid crystal layer. In another embodiment, monomer 134 can alternatively comprise thermally polymeric material. By locally heating the predetermined region, monomer in the liquid crystal layer can be thermally polymerized. In another embodiment, a power supply biases different voltage in different region of one pixel in the UV irradiation process. So the structures of polymer in different regions are different.

Figure 3D:
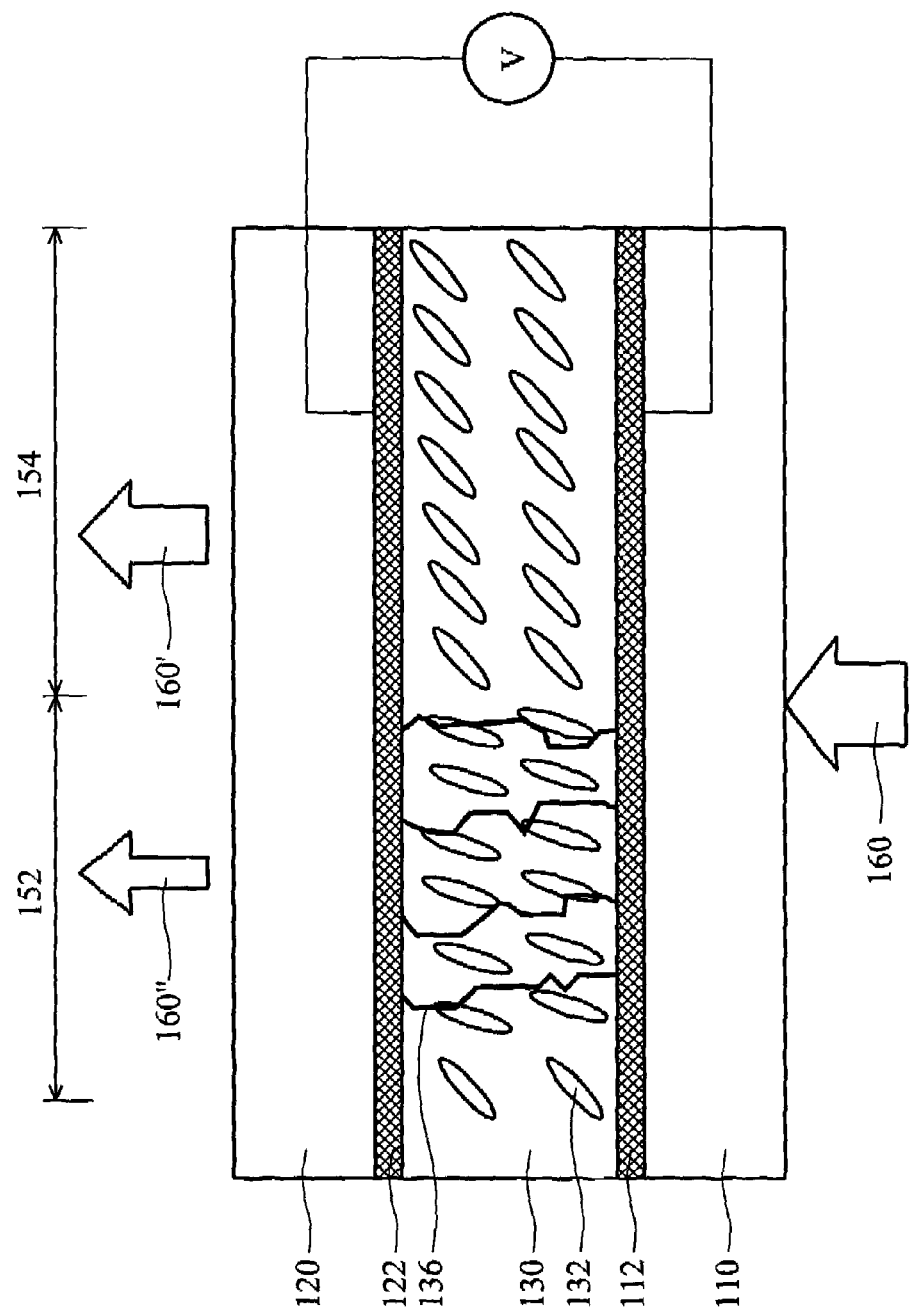

Referring to FIG. 3D, when driving voltage V is applied to the liquid crystal layer, liquid crystal molecules are rotated in the direction of the applied field. Liquid crystal molecules at the polymer dispersed region, i.e., at the predetermined region are rotated different from those at the non-polymer dispersed region. When a light source 160, such as a back light, passes through the liquid crystal display the polymer dispersed region 152 and the non-polymer dispersed region 154 possess different transparencies, thereby creating different optical characteristics 160' and 160" to widen the viewing angle.

Figure 4A:
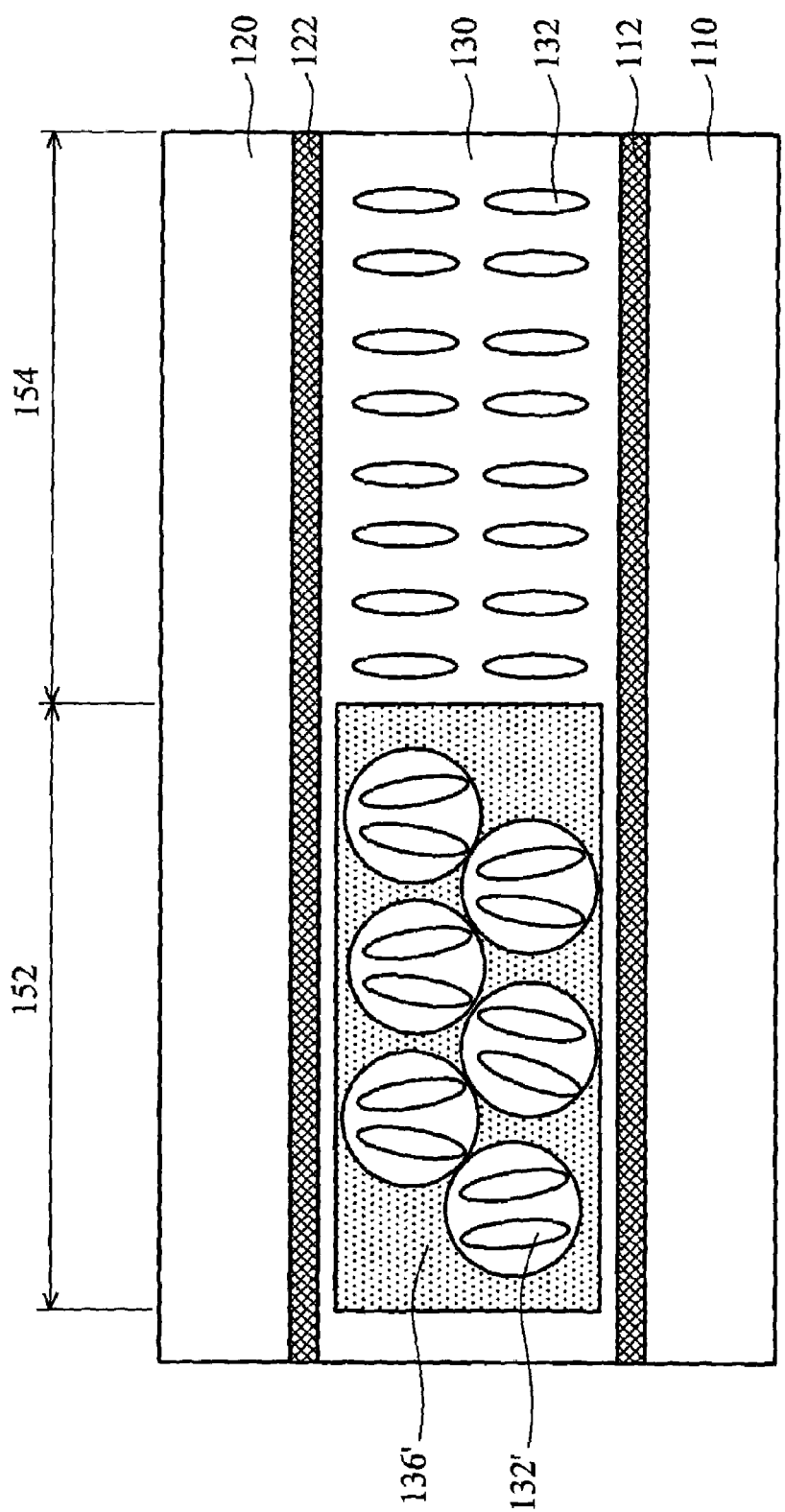
FIGS. 4A-4D are cross sections showing various embodiments of polymer dispersed liquid crystal (PDLC) displays.
Figure 4B:
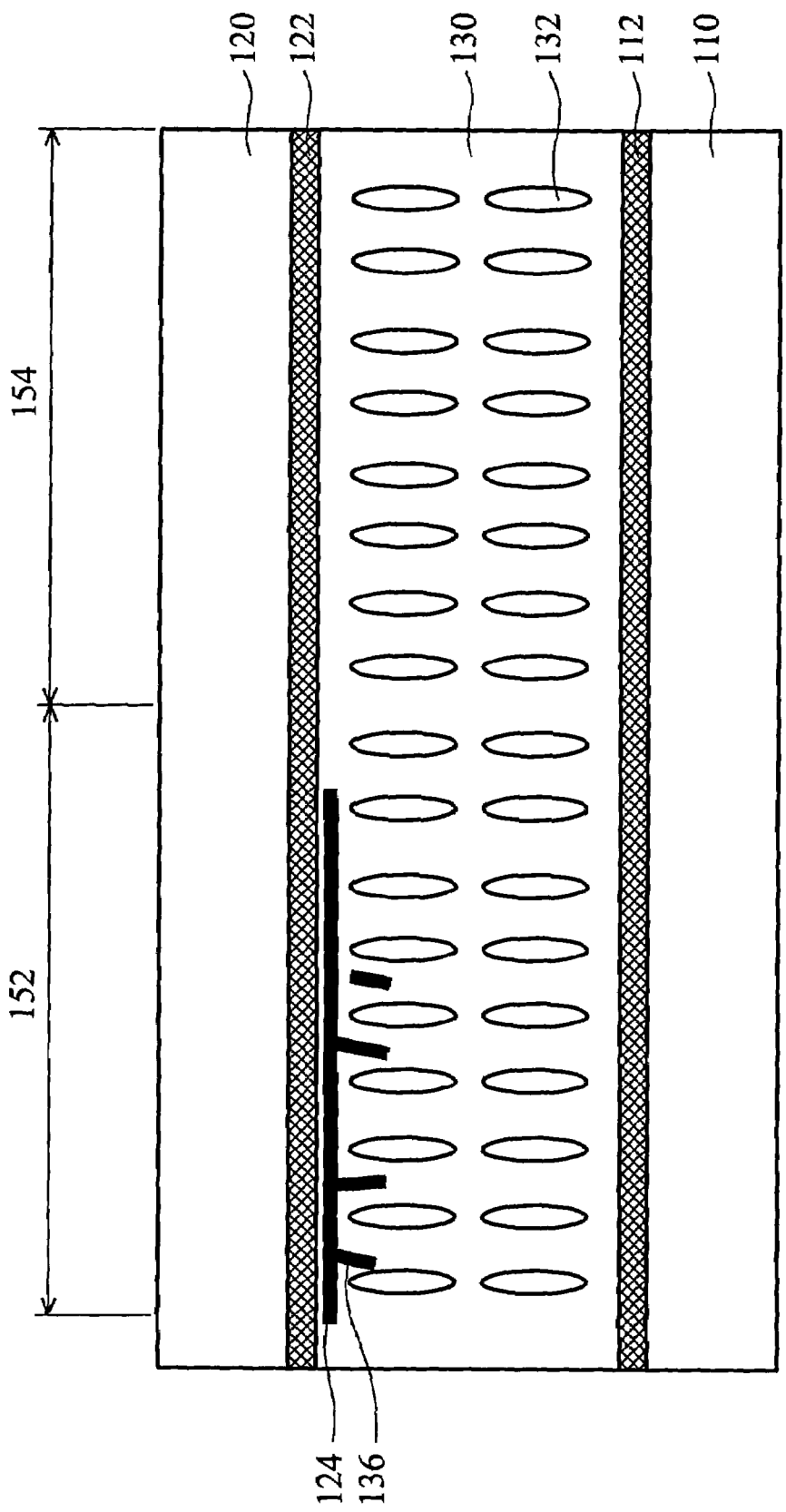
Figure 4C:
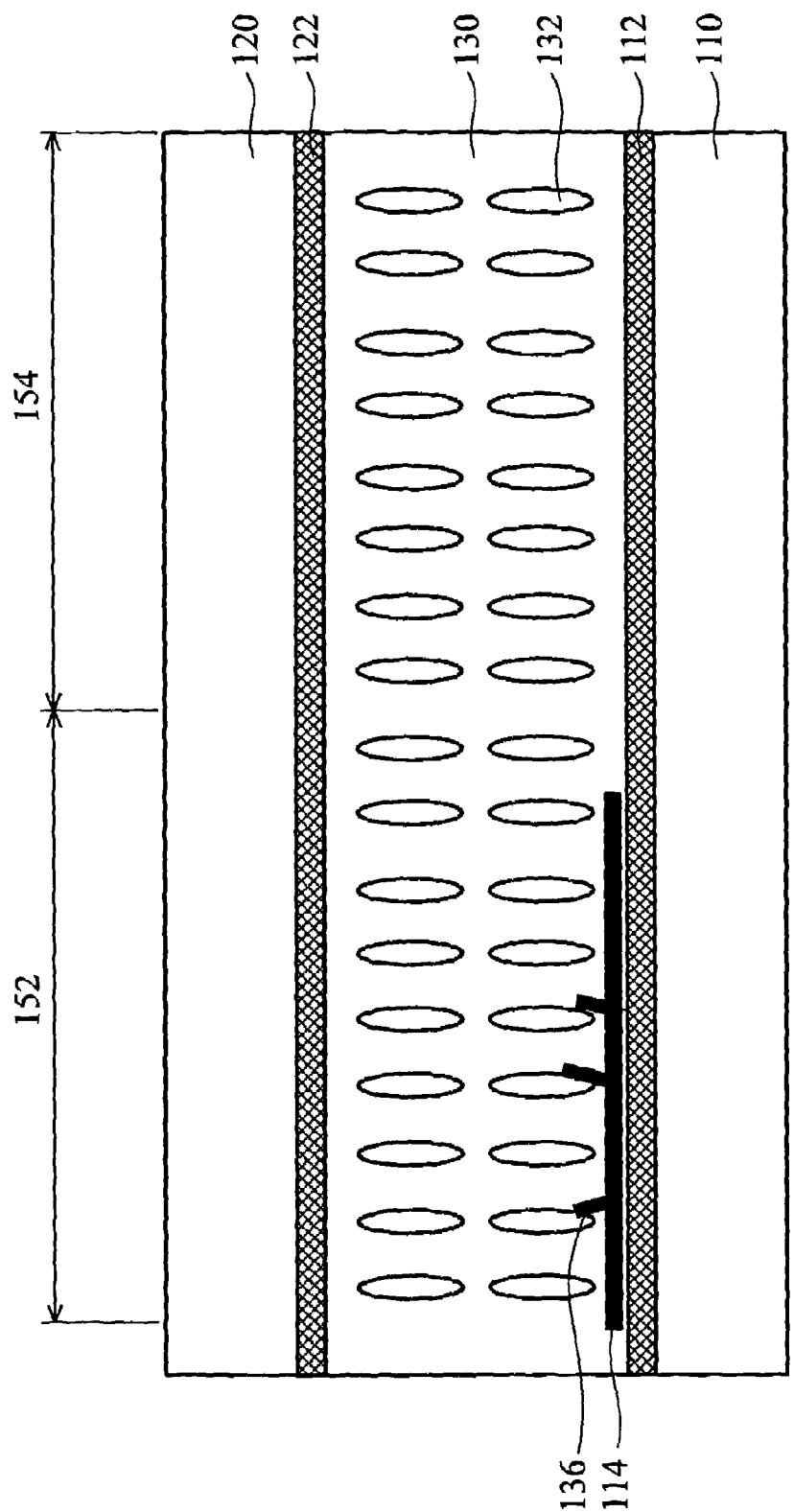
Figure 4D:
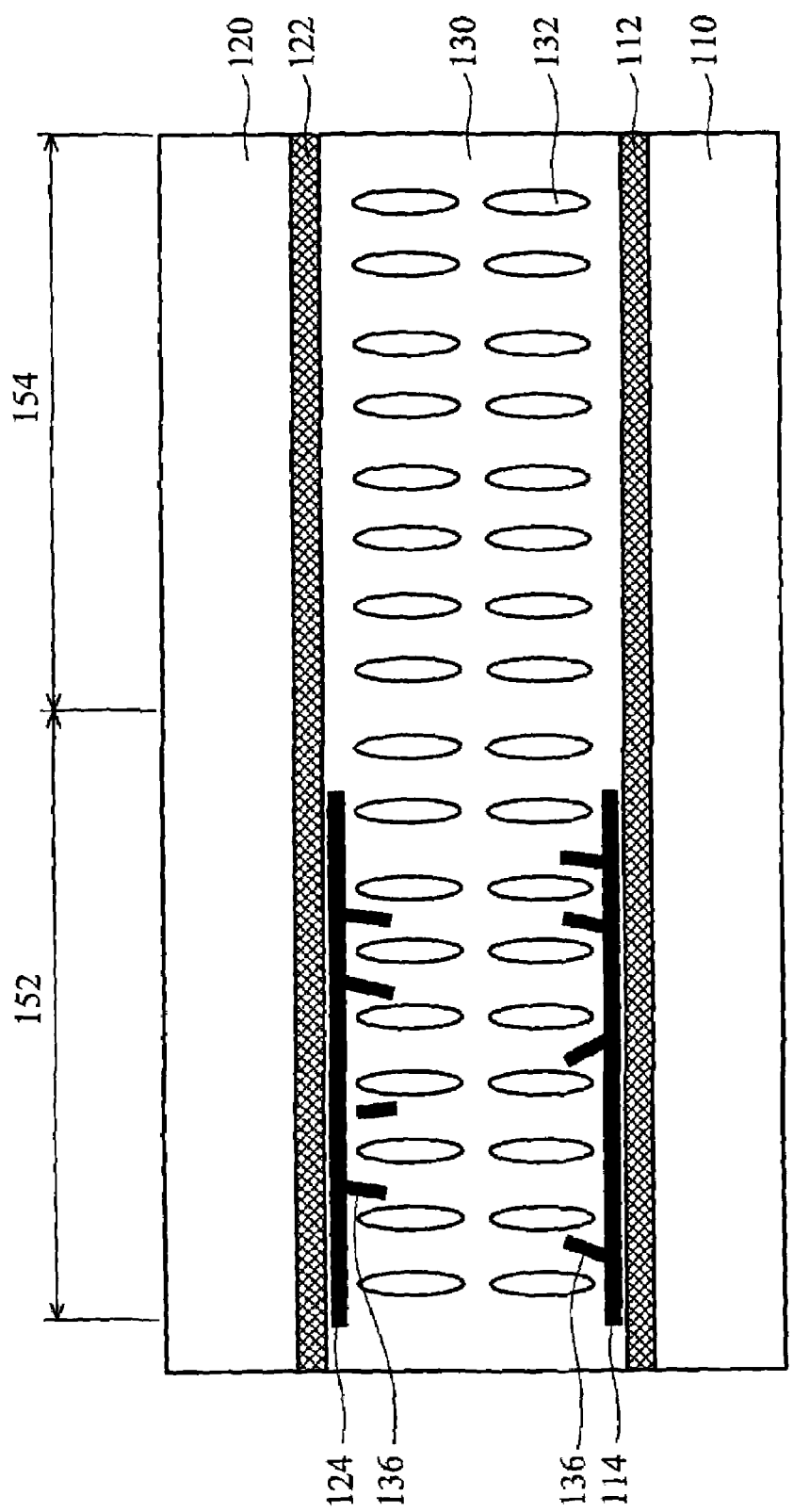

FIGS. 4A-4D are cross sections showing various embodiments of polymer dispersed liquid crystal (PDLC) displays. A PDLC region comprises a polymer structure and liquid crystal molecules. Referring to FIG. 4A, polymer structure 136' is dispersed between the first and the second substrates 110 and 120. Liquid crystal molecules 132' in the first LC region 152 are enclosed in the polymer structure 136'. Referring to FIG. 4B, polymer structures 124 and 136 are formed on an inner surface of the second substrate 120 at the first LC region 152. The polymer structures 124 and 136 are formed at the interface between the liquid crystal layer 130 and the second substrate 120. The polymer structure 136 has one end fixed to the polymer structure 124 and the other end extending into the liquid crystal layer 130. Referring to FIG. 4C, polymer structures 114 and 136 are formed on an inner surface of the first substrate 110 at the first LC region 152. The polymer structures 124 and 136 are formed at the interface between the liquid crystal layer 130 and the first substrate 110. The polymer structure 136 has one end fixed to the polymer structure 114 and the other end extending into the liquid crystal layer 130. Referring to FIG. 4D, polymer structures 114, 124, and 136 are formed on an inner surface of the first substrate 110 and an inner surface of the second substrate 120 at the first LC region 152. The polymer structures 114, 124, and 136 are formed at the interface between the liquid crystal layer 130 and the first substrate 110 and the interface between the liquid crystal layer 130 and the second substrate 120. The polymer structure 136 has one end fixed to the polymer structure 124 and the other end extending into the liquid crystal layer 130. The polymer structure 136 has one end fixed to the polymer structure 114 and the other end extending into the liquid crystal layer 130.

FIGS. 5A-5D are schematic views showing various embodiments of the lithographic masks. Each mask can be used in lithographic steps in FIG. 3B. Patterns on the mask corresponds to pixel regions between scanning line and data line of the liquid crystal display, and are divided into a transparent region 152 and opaque region 154.

Referring to FIG. 5A, the opaque region 154 of the mask 152a comprises a triangular region at the center of each pixel region. The triangular region comprises a long edge parallel to the longitudinal side of each pixel region. Referring to FIG. 5B, the opaque region 154 of the mask 152b comprises two opposing right angle triangular region formed at corners of each pixel regions. The right angle edges of the right angle triangular regions are parallel to the sides of each pixel region. Referring to FIG. 5C, the opaque region 154 of the mask 152c comprises two opposing trapezoid regions formed at corners of each pixel region. The right angle edges of the trapezoid regions are parallel to the sides of each pixel region. Referring to FIG. 5D, the opaque region 154 of the mask 152d comprises two opposite right angle triangle regions formed at the center of each pixel region. The right angle edges of the right angle triangular regions are parallel to the sides of each pixel region.

After UV light irradiation, the liquid crystal layer between the first and the second electrodes is polymerized. Monomers are polymerized into a continuous polymer network. The orientation of the liquid crystal molecules become more consistent in the polymer dispersed region. The unirradiated region does not polymerize, thereby different optical characteristics are created from the polymer dispersed region to widen the viewing angle.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A liquid crystal display, comprising:
   a first substrate with an active matrix of a plurality of pixels;
   a second substrate opposing the first substrate; and
   a liquid crystal layer interposed between the first substrate and the second substrate;
   wherein each pixel comprises a polymer dispersed liquid crystal layer corresponding to a first liquid crystal region and a substantially non-polymer dispersed liquid crystal layer corresponding to a second liquid crystal region, and the first liquid crystal region comprises polymers and liquid crystal molecules, wherein the polymers are adhered to the first substrate and the second substrate, and the polymers capsulate the liquid crystal molecules.

2. The display as claimed in claim 1, wherein the polymers are formed on the first substrate corresponding to the first liquid crystal region.

3. The display as claimed in claim 1, wherein the polymers are formed on the second substrate corresponding to the first liquid crystal region.

4. The display as claimed in claim 1, wherein the polymers are formed on the first substrate and the second substrate corresponding to the first liquid crystal region.

5. The display as claimed in claims 1, wherein the polymers are photopolymers or thermal polymers.

6. A method for fabricating a liquid crystal display, comprising:
   providing a first substrate with an active matrix of a plurality of pixels;
   providing a second substrate opposing the first substrate; and
   forming a liquid crystal layer interposed between the first substrate and the second substrate;
   wherein each pixel comprises a polymer dispersed liquid crystal layer corresponding to a first liquid crystal region and a substantially non-polymer dispersed liquid crystal layer corresponding to a second liquid crystal region, and the first liquid crystal region comprises polymers and liquid crystal molecules, wherein the polymers are adhered to the first substrate and the second substrate; and the polymers capsulate the liquid crystal molecules.

7. The method as claimed in claim 6, wherein the polymers are formed on the first substrate corresponding to the first liquid crystal region.

8. The method as claimed in claim 6, wherein the polymers are formed on the second substrate corresponding to the first liquid crystal region.

9. The method as claimed in claim 6, wherein the polymers are formed on the first substrate and the second substrate corresponding to the first liquid crystal region.

10. The method as claimed in claims 6, wherein the polymers are photopolymers or thermal polymers.

11. A method for fabricating a liquid crystal display, comprising:
   providing a first substrate with an active matrix of a plurality of pixels;
   providing a second substrate opposing the first substrate; and
   forming a liquid crystal layer with monomers interposed between the first substrate and the second substrate;
   selectively polymerizing the monomers in the liquid crystal layer such that each pixel comprises a polymer dispersed liquid crystal layer corresponding to a first liquid crystal region and a substantially non-polymer dispersed liquid crystal layer corresponding to a second liquid crystal region.

12. The method as claimed in claim 11, wherein the first liquid crystal region comprises polymers and liquid crystal molecules.

13. The method as claimed in claim 12, wherein the polymers are adhered to the first substrate and the second substrate; and the polymers capsulate the liquid crystal molecules.

14. The method as claimed in claim 12, wherein the polymers are formed on the first substrate corresponding to the first liquid crystal region.

15. The method as claimed in claim 12, wherein the polymers are formed on the second substrate corresponding to the first liquid crystal region.

16. The method as claimed in claim 12, wherein the polymers are formed on the first substrate and the second substrate corresponding to the first liquid crystal region.

17. The method as claimed in claims 12, wherein the monomers are thermally polymerizing monomers or photo-polymerizing monomers.

18. The method as claimed in claim 11, wherein the liquid crystal layer further comprises an inducer in the first liquid crystal region.

19. The method as claimed in claim 11, wherein the step of selectively polymerizing the monomers is performed by a lithographic process.

20. The method as claimed in claim 19, wherein the lithographic process comprises:
   forming a mask with an opening on the first substrate or the second substrate, the opening exposing the first liquid crystal region; and
   irradiating light of a predetermined wavelength on the opening to polymerize the monomer in the first liquid crystal region.

* * * * *